Oct. 22, 1940.  H. COLOMB  2,219,068
PIVOT BEARING FOR WATCH MOVEMENTS
Filed June 21, 1938
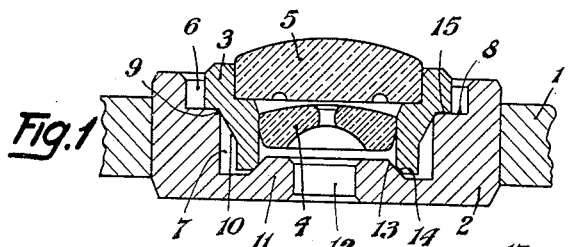
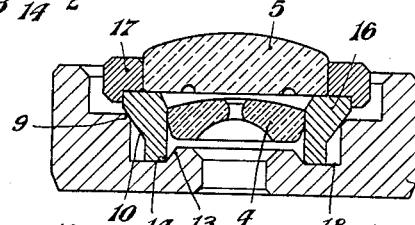
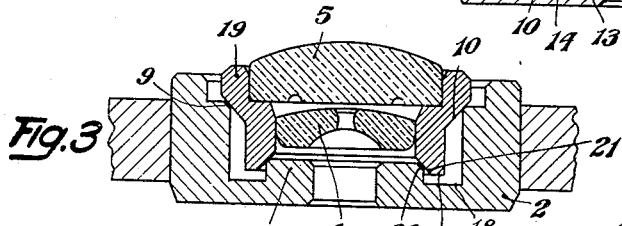
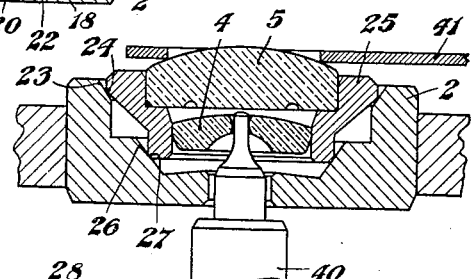
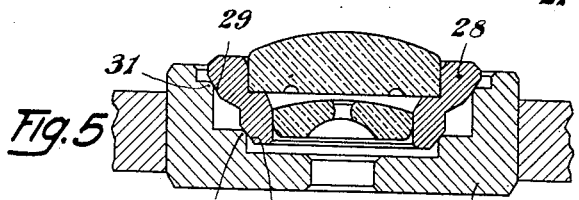
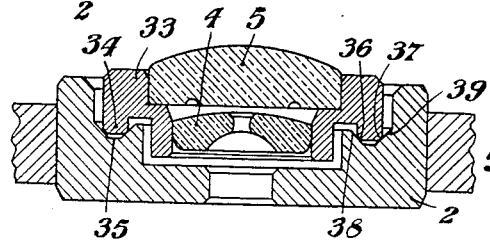
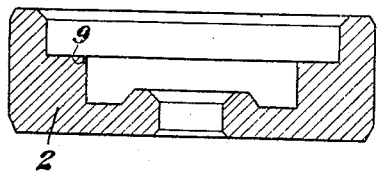
H. Colomb
Inventor
By: Glascock Downing & Seebold
Attys.

Patented Oct. 22, 1940

2,219,068

UNITED STATES PATENT OFFICE 2,219,068

PIVOT BEARING FOR WATCH MOVEMENTS

Henri Colomb, Lausanne, Switzerland

Application June 21, 1938, Serial No. 215,024
In Switzerland June 26, 1937

3 Claims. (Cl. 58—140)

This invention relates to pivot bearings for watch movements, of the type including a perforated bearing member and a cap bearing member which are yieldingly mounted so as to prevent shocks and jars from breaking the spindle supported in the bearing.

The object of the invention is to provide a watch spindle bearing of improved construction, in which the yieldable bearing portion is precisely centered in the relatively fixed bearing portion by the provision of two pairs of coacting circular surfaces provided on the fixed bearing portion and on the movable bearing portion, one at least of the coacting surfaces of each pair being a conical surface.

The accompanying drawing illustrates various forms of embodiment of a pivot bearing for watches according to the invention.

Figures 1 to 6 represent each an axial section of a different form of bearing for a watch balance spindle.

Figure 7 shows a modification of the relatively fixed bearing portion according to Fig. 2.

The bearing represented in Fig. 1 is mounted in the balance wheel bridge 1 of a watch movement and comprises a relatively fixed bearing portion 2 carried by the bridge 1 and acting as support for the movable bearing portion. This latter comprises an annular member 3 which carries the usual perforated jewel 4 and the cap jewel 5. A spring, not shown, acts in known manner on the cap jewel and yieldingly holds the movable bearing portion in place in the support 2. A complete bearing of this general type is described in my copending application Ser. No. 73,765 of April 10, 1936 now Patent No. 2,146,329 granted February 7, 1939.

The support 2 is provided with a circular recess 6 and with a circular recess 7 of smaller diameter than the recess 6, a shoulder 8 being formed between the two recesses. The edge 9 of the shoulder is slightly rounded or bevelled and coacts with a conical circular surface 10 of the annular member 3 which bears on the edge 9 by means of this surface 10.

The bottom of the recess 7 of the support 2 is formed with a central boss 11 provided with an axial hole 12 for the passage of the balance spindle. The boss 11 has a conical surface 13 coacting with the circular, slightly rounded or bevelled edge 14 provided at the bottom end of the annular member 3. This member 3 is thus maintained in central position in the support 2 by means of two pairs of coacting circular surfaces 9, 10 and 13, 14, one of the surfaces of each pair being conical.

When the balance spindle is subjected to a transversely directed shock, this shock is transmitted to the movable bearing member 3. This latter is then moved against the action of the shock absorbing spring, but in order to incline itself as it is the case in ordinary shock absorbing bearings, the annular member 3, owing to the two pairs of coacting surfaces, is raised while remaining in vertical position parallel to the axis of the spindle. For this reason there exists no danger that the pivot of the balance spindle is bent, or that the wall of the perforation in the jewel is hurt by the pivot, while such damages frequently occur when the movable bearing portion becomes inclined, particularly when the perforation in the jewel is straight cylindrical and not provided with bevelled ends.

The annular member 3 is still provided with a transverse annular surface 15 which may rest on the shoulder 8. The two surfaces 15 and 8 are however not necessary for the centering of the member 3, but they are useful during the process of manufacturing these two parts and serve as limiting stops for the movement of the die or punch used for final trueing of these parts, according to the method described in my copending application Ser. No. 215,023 filed of even date herewith.

In the example according to Fig. 2 the perforated jewel 4 is carried in an annular member 16 and the cap jewel 5 is mounted in a ring 17 loosely placed on the member 16 and held in position by the shock absorbing spring acting on the cap jewel. One pair of coacting circular surfaces is constituted by the slightly bevelled edge 9 of the support 2 and the conical surface 10 of the member 16, and the second pair of coacting surfaces is formed by the conical surface 13 of the support 2 and the slightly rounded or bevelled edge 14 at the bottom end of the member 16. The transverse end face of the member 16 abuts against the bottom face 18 of the support 2.

In the example according to Fig. 3 the perforated jewel 4 and the cap jewel 5 are carried by an annular member 19 provided with a conical surface 10 bearing on the slightly rounded edge 9 of the support 2. The central boss 11 of the support 2 is provided with a slightly bevelled edge 20 coacting with a conical surface 21 of the annular member 19. The end face 22 of the member 19 is slightly spaced from the bottom face 18 of the support 2.

In Fig. 4 one of the pairs of coacting circular surfaces is constituted by a conical surface 23 on the support 2, on which bears the slightly rounded or bevelled edge 24 of the annular member 25 bearing the perforated jewel 4 and the cap jewel 5, and the other pair is constituted by a conical surface 26 of the support 2 and by the bevelled edge 27 of the annular member 24. 40 indicates the watch balance spindle, and 41 the spring blade acting on the cap jewel 5.

In the example according to Fig. 5 the annular member 28 is provided with two conical surfaces 29 and 30 coacting with two bevelled edges 31 and 32 of the support 2.

In Fig. 6 the annular member 33 carrying the perforated jewel 4 and the cap jewel 5 is provided with a downwardly extending flange 34 penetrating into an annular groove 35 of the support 2. The flange 34 is provided with two bevelled edges 36 and 37 which coact with the conical surfaces 38 and 39 of the groove 35.

Fig. 7 shows a bearing support 2 which is identical to the member 2 in Fig. 2, but in which the edge 9 is not bevelled, but is left sharp.

I claim:

1. In a pivot bearing for a watch movement spindle, a bearing support with a cavity and an annular shoulder dividing said cavity into an upper and a lower chamber, a central boss within said lower chamber, formed integral with said bearing support and provided with an axial hole for the passage of the spindle, a bearing aggregate including a frame ring, a perforated member and a cap member, said members being carried by said frame ring to yieldingly move as a whole within said cavity upon radial and axial shocks on the spindle, resilient means acting upon the cap member for yieldingly maintaining said aggregate in the bearing support, a first group of co-operating circular centering elements disposed on the outer peripheral side of the frame ring and on the annular shoulder of the bearing support respectively, and a second group of co-operating circular centering elements disposed on the central boss of the bearing support and on the inner peripheral side of the frame ring respectively, each group containing at least one conical surface, and said surfaces being oppositely inclined relative to the bearing axis so as to maintain axial alinement of the bearing aggregate.

2. In a pivot bearing for a watch movement spindle, a bearing support with a cavity and an annular shoulder dividing said cavity into an upper and a lower chamber, the bottom of said support being provided with an axial hole for the passage of the spindle and the annular shoulder being provided with a circular V-shaped groove, a bearing aggregate including a frame ring, a perforated member and a cap member, said members being mounted in the frame ring and said ring being constructed to form an outer circular projection fitting into said V-shaped groove so as to permit said members to yieldingly move as a whole within said cavity upon radial and axial shocks on the spindle, resilient means acting upon the cap member for yieldingly maintaining said aggregate in the bearing support, and two groups of circular centering elements comprising two oppositely inclined conical surfaces formed by the side faces of the V-shaped groove in the bearing support and two substantially bevelled edges disposed on the inner and outer peripheral side of the circular projection of the frame ring and coacting with said conical surfaces to maintaining axial alinement of the bearing aggregate.

3. In a pivot bearing for a watch movement spindle, a bearing support with a cavity and an annular shoulder dividing said cavity in an upper and a lower chamber, a bearing aggregate including a perforated member and a cap member mounted to yieldingly move as a whole within said cavity upon radial and axial shocks on the spindle, resilient means acting upon said cap member for yieldingly maintaining said aggregate in the bearing support, and two groups of two co-operating circular centering elements provided on the bearing support and the bearing aggregate, respectively, and comprising at least two conical surfaces oppositely inclined relative to the bearing axis so as to maintain axial alinement of the bearing aggregate, the centering elements on said aggregate being spaced apart on an inner and an outer peripheral side thereof.

HENRI COLOMB.